D. C. RIPLEY.

Salt and Pepper Dredges.

No. 5,666. Reissued Nov. 18, 1873.

Witnesses { James L. Kay, Fred. Staudt

Inventor Daniel C. Ripley by Barnwell Christy & Kenn his attys

UNITED STATES PATENT OFFICE.

DANIEL C. RIPLEY, OF PITTSBURG, PENNSYLVANIA.

IMPROVEMENT IN SALT AND PEPPER DREDGES.

Specification forming part of Letters Patent No. 142,351, dated September 2, 1873; reissue No. 5,666, dated November 18, 1873; application filed October 13, 1873.

*To all whom it may concern:*

Be it known that I, DANIEL C. RIPLEY, of Pittsburg, in the county of Allegheny and State of Pennsylvania, have invented a new and useful Improvement in Salt and Pepper Dredges; and I do hereby declare the following to be a full, clear, and exact description thereof, reference being had to the accompanying drawing forming a part of this specification, in which—

Figure 1:
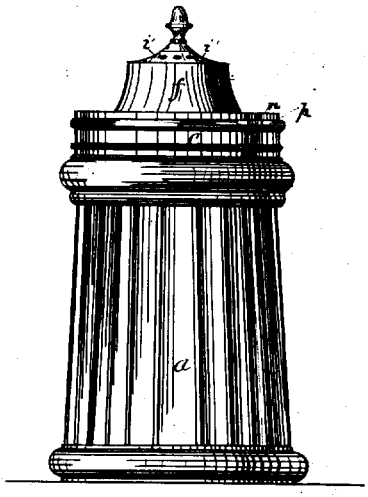
Figure 2:
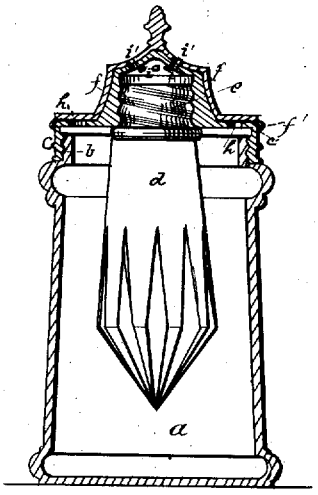
Figure 3:
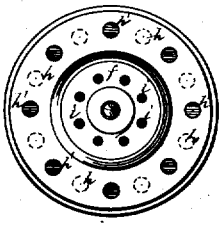

Figure 1 is a side elevation of my improved salt and pepper dredge. Fig. 2 is a vertical section of the same, and Fig. 3 is a plan view of the cap.

Like letters of reference indicate like parts in each.

My invention relates to the construction of an improved dredge for table and culinary uses; and it consists, first, of two distinct and separate chambers or compartments sifting through the same top; and, second, of the combination of the said compartments with a rotating cap, by means of which either compartment may be opened while the other is closed, the perforations in the caps registering with the desired compartment upon the rotation of the cap.

The object of my invention is a dredge which will contain two different condiments.

To enable others skilled in the art to make and use my improvement, I will describe its construction and manner of use.

In the drawing I show a form of my invention which is especially designed for table use.

I make the body or can *a* of any desired shape or material. I prefer, however, to make it of glass, as it is the cheapest and most suitable. Around its mouth I make a thread, *b*, upon which I screw a stationary cap, *c*. The cap *c* has a threaded socket, *e*, in its center for the reception of the threaded end of the receptacle *d*, which extends down into the can *a*. In the cap *c* I make two sets of holes or perforations, the first set, *h*, opening into the can *a*, and the second set, *i*, opening into the receptacle *d*. Upon the face of the cap *c* I put a turning or rotating cover or cap, *f*, which is secured by its overlapping lip *f'*, burnished or drawn in around the projecting edge *c'* of the cap *c*. The cover *f* has a slight rotating motion over the face of the cap *c*, which is limited by a stop, *n*, extending down into the slot *p* in the cap *c*, or by any other equivalent stop device.

The perforations of the two series *h* and *i* in the cap *c* are placed opposite each other. In the cover *f* I make two similar sets or series of perforations, *h'* and *i'*, which correspond with the perforations *h* and *i* in every respect, except in their relative arrangement, not being placed opposite to but alternately with each other.

The effect of this arrangement is, that when the two caps are put together, and either two corresponding sets, such as the set *i* in cap *c*, and the set *i'* in the cover *f*, are brought together, the other two sets, *h* and *h'*, will be disconnected, as shown in Fig. 3, so as to close the openings from the can *a*. By turning the cap *f* the extent of its movement, these perforations will be brought together and the perforations *i* and *i'* will be separated, thereby closing the openings from the receptacle *d*, and opening those from the can *a*.

The stop device may be omitted, if desired, its object being convenience in registering the perforations in the caps.

The dredge shown is more particularly designed for use with pepper and salt.

It is evident to all that the arrangement of the compartments may be changed, as, for instance, the can *a* may be divided equally into two compartments by a division-wall extending across it, and the perforations be arranged so that when in use they may be open to the desired compartment and closed to the other.

The utility of my improvement and the advantages arising from its use are evident, and I will not enlarge thereupon.

What I claim as my invention, and desire to secure by Letters Patent, is—

1. A dredge having two compartments with the discharge-openings at one and the same end, as described.

2. The combination, in a dredge, of two compartments with a rotating registering-cap, substantially as described.

3. A dredge having separate compartments *a* and *d* and two caps, *c* and *f*, one of which has a slight rotary motion, and both having perforations arranged relatively to each other, as described, so that, by the rotation of the cap *f'*, either compartment may be opened while the other is closed, substantially as set forth, and for the purposes specified.

In witness whereof I, the said DANIEL C. RIPLEY, have hereunto set my hand.

DANIEL C. RIPLEY.

Witnesses:

T. B. KERR,

JAMES I. KAY.